(12) United States Patent
Chen et al.

(10) Patent No.: US 11,747,592 B2
(45) Date of Patent: Sep. 5, 2023

(54) CAMERA OPTICAL LENS

(71) Applicant: AAC Optics (Changzhou) Co., Ltd., Changzhou (CN)

(72) Inventors: Jia Chen, Shenzhen (CN); Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 356 days.

(21) Appl. No.: 17/134,207

(22) Filed: Dec. 25, 2020

(65) Prior Publication Data
US 2022/0050264 A1 Feb. 17, 2022

(30) Foreign Application Priority Data
Aug. 12, 2020 (CN) .......................... 202010804039.4

(51) Int. Cl.
*G02B 9/60* (2006.01)
*G02B 13/18* (2006.01)

(52) U.S. Cl.
CPC .............. *G02B 9/60* (2013.01); *G02B 13/18* (2013.01)

(58) Field of Classification Search
CPC ...... G02B 9/60; G02B 13/18; G02B 13/0045; G02B 13/06
See application file for complete search history.

(56) References Cited

U.S. PATENT DOCUMENTS

| | | | |
|---|---|---|---|
| 9,964,740 B1 | 5/2018 | Wang | |
| 2016/0320589 A1 | 11/2016 | Liao et al. | |
| 2018/0284394 A1 | 10/2018 | Chen et al. | |
| 2020/0150383 A1* | 5/2020 | Wenren | G02B 13/0045 |

FOREIGN PATENT DOCUMENTS

| | | |
|---|---|---|
| CN | 106802466 A | 6/2017 |
| CN | 108152922 A | 6/2018 |
| CN | 108169876 A | 6/2018 |
| CN | 109375349 A | 2/2019 |
| JP | 1998333034 A1 | 12/1998 |
| JP | 2017521686 A | 8/2017 |
| JP | 2018151581 A | 9/2018 |
| TW | 201631352 A | 9/2016 |
| TW | 201638626 A | 11/2016 |

OTHER PUBLICATIONS

Yan et. al. ( "Miniature camera lens design with a freeform surface", PROC. SPIIE 10590 international design conference 2017 ) (Year: 2017).*

\* cited by examiner

*Primary Examiner* — Robert E. Tallman
(74) *Attorney, Agent, or Firm* — W&G Law Group (57) ABSTRACT

A camera optical lens includes, from an object side to an image side, a first lens having a positive refractive power, a second lens having a negative refractive power, a third lens having a positive refractive power, a fourth lens having a negative refractive power, and a fifth lens, with at least one of the first to fifth lenses having a free-form surface, and satisfies: $-3.50 \leq f4/f \leq -0.35$; $-8.00 \leq R10/f \leq -1.00$; and $2.00 \leq d8/d7 \leq 8.00$, where f and f4 respectively denote focal lengths of the camera optical lens and the fourth lens; R10 denotes a central curvature radius of an image side surface of the fifth lens; d7 denotes an on-axis thickness of the fourth lens; and d8 denotes an on-axis distance from an image side surface of the fourth lens to an object side surface of the fifth lens, thereby having good optical performance while satisfying design requirements of a long focal length and ultra-thinness.

9 Claims, 8 Drawing Sheets

CAMERA OPTICAL LENS

TECHNICAL FIELD

The present invention relates to the field of optical lens, and more particularly, to a camera optical lens suitable for portable terminal devices such as smart phones or digital cameras and camera devices such as monitors or PC lenses.

BACKGROUND

With the development of camera lenses, higher and higher requirements are put forward for imaging quality of the lenses. The "night scene photography" and "bokeh" of the lens have also become important indexes to measure the imaging performances of the lens. At present, rotationally symmetric aspherical surfaces are mostly used. Such an aspherical surface has a sufficient degree of freedom only in a meridian plane, and cannot well correct off-axis aberration. The existing structures have insufficient refractive power allocation, lens spacing and lens shape settings, resulting in insufficient ultra-thinness and insufficient long focal length of the lenses. A free-form surface is a non-rotationally symmetric surface, which can better balance aberration and improve the imaging quality; besides, processing of the free-form surface has gradually become mature. With the increasing requirements for imaging of the lens, it is very important to provide a free-form surface in the design of a lens, especially in the design of wide-angle and ultra-wide-angle lenses.

SUMMARY

In view of the problems, the present invention aims to provide a camera optical lens, which has characteristics of a long focal length and ultra-thinness while achieving good optical performance.

In an embodiment, the present invention provides a camera optical lens. The camera optical lens includes, from an object side to an image side, a first lens having a positive refractive power, a second lens having a negative refractive power, a third lens having a positive refractive power, a fourth lens having a negative refractive power, and a fifth lens; and at least one of the first lens to the fifth lens has a free-form surface, and the camera optical lens satisfies following conditions: $-3.50 \leq f4/f \leq -0.35$; $-8.00 \leq R10/f \leq -1.00$; and $2.00 \leq d8/d7 \leq 8.00$, where f denotes a focal length of the camera optical lens; f4 denotes a focal length of the fourth lens; R10 denotes a central curvature radius of an image side surface of the fifth lens; d7 denotes an on-axis thickness of the fourth lens; and d8 denotes an on-axis distance from an image side surface of the fourth lens to an object side surface of the fifth lens.

In an improved embodiment, the camera optical lens further satisfies a following condition: $1.50 \leq d4/d3 \leq 5.00$, where d3 denotes an on-axis thickness of the second lens, and d4 denotes an on-axis distance from an image side surface of the second lens to an object side surface of the third lens.

In an improved embodiment, the camera optical lens further satisfies following conditions: $0.20 \leq f1/f \leq 0.76$; $-1.48 < (R1+R2)/(R1-R2) < -0.31$; and $0.08 \leq d1/TTL \leq 0.36$, where f1 denotes a focal length of the first lens, R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

In an improved embodiment, the camera optical lens further satisfies following conditions: $-1.07 \leq f2/f \leq -0.32$; $0.10 < (R3+R4)/(R3-R4) \leq 0.62$; and $0.02 \leq d3/TTL \leq 0.06$, where f2 denotes a focal length of the second lens, R3 denotes a central curvature radius of an object side surface of the second lens, R4 denotes a central curvature radius of an image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $0.27 \leq f3/f \leq 1.76$; $-0.88 < (R5+R6)/(R5-R6) \leq 1.41$; and $0.03 \leq d5/TTL \leq 0.13$, where f3 denotes a focal length of the third lens, R5 denotes a central curvature radius of an object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $0.52 < (R7+R8)/(R7-R8) \leq 6.56$; and $0.02 \leq d7/TTL \leq 0.10$, where R7 denotes a central curvature radius of an object side surface of the fourth lens, R8 denotes a central curvature radius of the image side surface of the fourth lens, and TTL denotes a total optical length from an object side surface of the first lens to an image plane of the camera optical lens along an optic axis.

In an improved embodiment, the camera optical lens further satisfies following conditions: $-5.26 \leq f5/f \leq 13.22$; $-3.22 < (R9+R10)/(R9-R10) \leq 9.38$; and $0.04 \leq d9/TTL \leq 0.18$, where f5 denotes a focal length of the fifth lens, R9 denotes a central curvature radius of the object side surface of the fifth lens, d9 denotes an on-axis thickness of the fifth lens, and TTL denotes a total optical length from an object side surface of the first lens to an image plane of the camera optical lens along an optic axis.

In an improved embodiment, the camera optical lens further satisfies a following condition: $f/TTL \geq 1.00$, where TTL denotes a total optical length from an object side surface of the first lens to an image plane of the camera optical lens along an optic axis.

In an improved embodiment, a total optical length from an object side surface of the first lens to an image plane of the camera optical lens along an optic axis is smaller than or equal to 8.59 mm.

In an improved embodiment, an F number of the camera optical lens is smaller than or equal to 2.47.

The present invention has at least the following beneficial effects. The camera optical lens according to the present invention has excellent optical performance while having the characteristics of a long focal length and ultra-thinness. Meanwhile, at least one of the first lens to the fifth lens has a free-form surface, which is beneficial to correct distortion and field curvature of the system and improve the imaging quality of the optical system, and is especially suitable for the mobile phone camera lens assembly and the WEB camera lens composed of imaging elements such as CCD and CMOS for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby are only to explain the invention, not intended to limit the invention.

Embodiment 1

Figure 1:
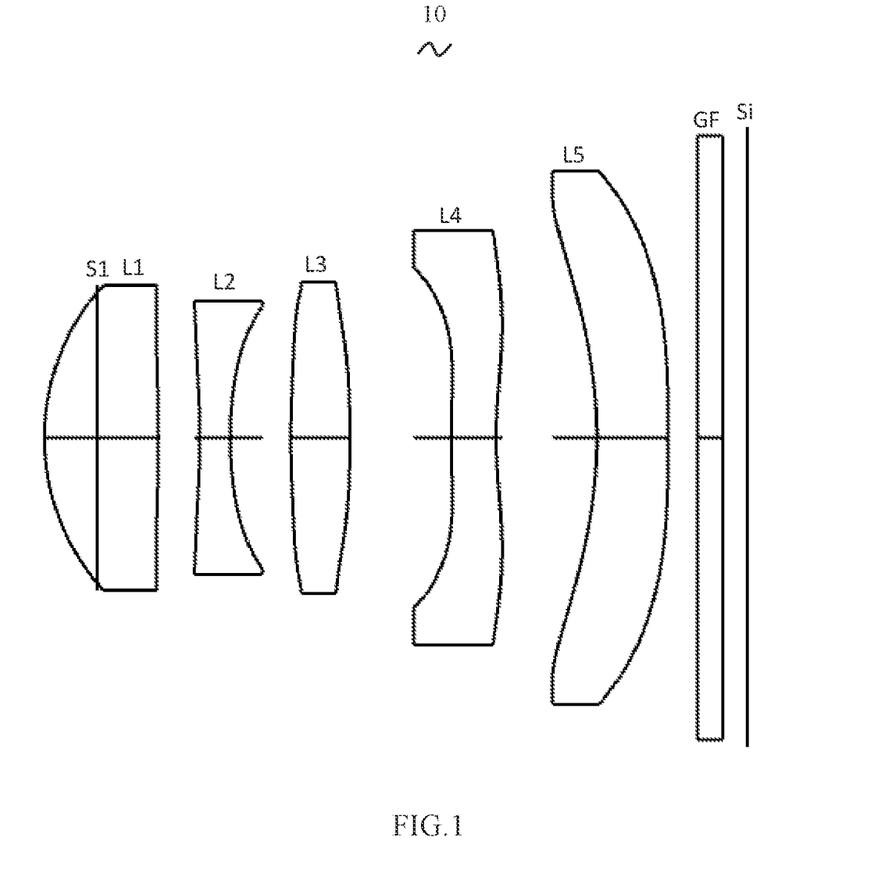
FIG. 1 is a schematic structural diagram of a camera optical lens according to a Embodiment 1 of the present invention.

Referring to FIG. 1, the present invention provides a camera optical lens 10. FIG. 1 shows the camera optical lens 10 according to Embodiment 1 of the present invention. The camera optical lens 10 includes 5 lenses. Specifically, the camera optical lens 10 includes, from an object side to an image side, an aperture S1, a first lens L1, a second lens L2, a third lens L3, a fourth lens L4, and a fifth lens L5. An optical element such as an optical filter (GF) can be arranged between the fifth lens L5 and an image plane Si.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material. In other embodiments, each of the lenses can also be made of other materials.

In this embodiment, at least one of the first lens L1 to the fifth lens L5 includes a free-form surface, and the free-form surface facilitates correcting system distortion and field curvature, thereby improving imaging quality.

A focal length of the camera optical lens 10 is defined as f, and a focal length of the fourth lens L4 is defined as f4. The camera optical lens 10 satisfies a condition: $-3.50 \leq f4/f \leq -0.35$, which specifies a ratio of the focal length of the fourth lens L4 to the focal length of the camera optical lens 10. This condition can facilitate improving the imaging quality.

The focal length of the camera optical lens 10 is defined as f, and a central curvature radius of an image side surface of the fifth lens L5 is defined as R10. The camera optical lens 10 further satisfies a condition: $-8.00 \leq R10/f \leq -1.00$, which specifies a ratio of the central curvature radius of the image side surface of the fifth lens L5 to the focal length of the camera optical lens. This condition facilitates to improve the imaging performance of the system. As an example, the camera optical lens 10 further satisfies a condition: $-7.53 \leq R10/f \leq -1.19$.

An on-axis thickness of the fourth lens L4 is defined as d7, and an on-axis distance from an image side surface of the fourth lens L4 to an object side surface of the fifth lens L5 is defined as d8. The camera optical lens 10 further satisfies a condition: $2.00 \leq d8/d7 \leq 8.00$. When d8/d7 satisfies the condition, it can facilitate to reduce a total length of the system, thereby achieving ultra-thinness.

An on-axis thickness of the second lens L2 is defined as d3, and an on-axis distance from an image side surface of the second lens L2 to an object side surface of the third lens L3 is defined as d4. The camera optical lens 10 further satisfies a condition: $1.50 \leq d4/d3 \leq 5.00$. When d4/d3 satisfies the condition, it can facilitate to reduce a total length of the system, thereby achieving ultra-thinness. As an example, the camera optical lens 10 further satisfies a condition: $1.75 \leq d4/d3 \leq 4.76$.

In this embodiment, the first lens L1 has a positive refractive power, an object side surface of the first lens L1 is a convex surface at a paraxial position, and an image side surface of the first lens L1 is a convex surface at a paraxial position.

A focal length of the first lens L1 is defined as f1, and the focal length of the camera optical lens 10 is defined as f. The camera optical lens 10 further satisfies a condition: $0.20 \leq f1/f \leq 0.76$, which specifies a ratio of the focal length of the first lens L1 to the focal length of the system. When the condition is satisfied, the first lens L1 can have an appropriate positive refractive power, thereby facilitating reducing aberrations of the system. As an example, the camera optical lens 10 further satisfies a condition: $0.31 \leq f1/f \leq 0.61$.

A central curvature radius of the object side surface of the first lens L1 is defined as R1, and a central curvature radius of the image side surface of the first lens L1 is defined as R2. The camera optical lens 10 further satisfies a condition: $-1.48 < (R1+R2)/(R1-R2) < -0.31$. This can reasonably control a shape of the first lens L1, so that the first lens L1 can effectively correct spherical aberrations of the system. As an example, the camera optical lens 10 further satisfies a condition: $-0.92 < (R1+R2)/(R1-R2) < -0.39$.

An on-axis thickness of the first lens L1 is defined as d1, and a total optical length from the object side surface of the first lens L1 to an image plane of the camera optical lens 10 along an optic axis is defined as TTL. The camera optical lens 10 further satisfies a condition of $0.08 \leq d1/TTL \leq 0.36$. This can facilitate achieving ultra-thin lenses. As an example, the camera optical lens 10 further satisfies a condition, $0.13 \leq d1/TTL \leq 0.29$.

The second lens L2 has a negative refractive power, and it includes an object side surface being concave in a paraxial region and an image side surface being concave in the paraxial region.

The focal length of the camera optical lens 10 is defined as f, and a focal length of the second lens L2 is defined as f2. The camera optical lens 10 further satisfies a condition of −1.07≤f2/f≤−0.32. By controlling the negative refractive power of the second lens L2 in a reasonable range, it is beneficial to correct the aberration of the optical system. As an example, the camera optical lens 10 further satisfies a condition: −0.67≤f2/f≤−0.40.

A central curvature radius of the object side surface of the second lens L2 is defined as R3, and a central curvature radius of the image side surface of the second lens L2 is defined as R4. The camera optical lens 10 further satisfies a condition: 0.10<(R3+R4)/(R3−R4)≤0.62, which specifies a shape of the second lens L2. This can facilitate correction of the longitudinal aberration. As an example, the camera optical lens 10 further satisfies a condition: 0.16<(R3+R4)/(R3−R4)≤0.50.

An on-axis thickness of the second lens L2 is defined as d3, and the total optical length from the object side surface of the first lens L1 to the image plane of the camera optical lens 10 along the optic axis is defined as TTL. The camera optical lens 10 further satisfies a condition of 0.02≤d3/TTL≤0.06. This can facilitate achieving ultra-thinness. As an example, the camera optical lens 10 further satisfies a condition: 0.03≤d3/TTL≤0.05.

The third lens L3 has a positive refractive power, an object side surface of the third lens L3 is a convex surface at a paraxial position, and an image side surface of the third lens L3 is a convex surface at a paraxial position.

The focal length of the camera optical lens 10 is f, and a focal length of the third lens L3 is f3. The camera optical lens 10 further satisfies a condition: 0.27≤f3/f≤1.76. The appropriate allocation of the refractive power leads to better imaging quality and a lower sensitivity of the system. As an example, the camera optical lens 10 further satisfies a condition: 0.43≤f3/f≤1.40.

A central curvature radius of the object side surface of the third lens L3 is defined as R5, and a central curvature radius of the image side surface of the third lens L3 is defined as R6. The camera optical lens 10 further satisfies a condition: −0.88<(R5+R6)/(R5−R6)≤1.41. This can effectively control a shape of the third lens L3. This condition can alleviate the deflection of light passing through the lens while effectively reducing aberrations. As an example, the camera optical lens 10 further satisfies a condition: −0.55<(R5+R6)/(R5−R6)≤1.13.

An on-axis thickness of the third lens L3 is defined as d5, and the total optical length from the object side surface of the first lens L1 to the image plane of the camera optical lens 10 along the optic axis is defined as TTL. The camera optical lens 10 further satisfies a condition: 0.03≤d5/TTL≤0.13. This can facilitate achieving ultra-thin lenses. As an example, the camera optical lens 10 further satisfies a condition: 0.04≤d5/TTL≤0.10.

In this embodiment, the fourth lens L4 has a negative refractive power, an object side surface of the fourth lens L4 is convex at a paraxial position, and an image side surface of the fourth lens L4 is concave at a paraxial position.

A central curvature radius of the object side surface of the fourth lens L4 is defined as R7, and a central curvature radius of the image side surface of the fourth lens L4 is defined as R8. The camera optical lens 10 further satisfies a condition: 0.52<(R7+R8)/(R7−R8)≤6.56, which specifies a shape of the fourth lens L4. This can facilitate correction of an off-axis aberration. As an example, the camera optical lens 10 further satisfies a condition: 0.84<(R7+R8)/(R7−R8)≤5.24.

An on-axis thickness of the fourth lens L4 is defined as d7, and the total optical length from the object side surface of the first lens L1 to the image plane of the camera optical lens 10 along the optic axis is defined as TTL. The camera optical lens 10 further satisfies a condition: 0.02≤d7/TTL≤0.10. This can facilitate achieving ultra-thinness. As an example, the camera optical lens 10 further satisfies a condition: 0.03≤d7/TTL≤0.08.

In this embodiment, the fifth lens L5 has a negative refractive power, an object side surface of the fourth lens L5 is concave at a paraxial position, and an image side surface of the fourth lens L5 is convex at a paraxial position.

A focal length of the fifth lens L5 is defined as f5, and the focal length of the camera optical lens 10 is defined as f. The camera optical lens 10 further satisfies a condition: −5.26≤f5/f≤13.22. This condition can effectively smooth a light angle of the camera optical lens 10 and reduce the tolerance sensitivity. As an example, the camera optical lens 10 further satisfies a condition: −3.28≤f5/f≤10.58.

A central curvature radius of the object side surface of the fifth lens L5 is defined as R9, and a central curvature radius of the image side surface of the fifth lens L5 is defined as R10. The camera optical lens 10 further satisfies a condition: −3.22<(R9+R10)/(R9−R10)≤9.38, which specifies a shape of the fifth lens L5. This can facilitate correction of an off-axis aberration. As an example, the camera optical lens 10 further satisfies a condition: −2.01≤(R9+R10)/(R9−R10)≤7.51.

An on-axis thickness of the fifth lens L5 is defined as d9, and the total optical length from the object side surface of the first lens L1 to the image plane of the camera optical lens 10 along the optic axis is defined as TTL. The camera optical lens 10 further satisfies a condition: 0.04≤d9/TTL≤0.18. This can facilitate achieving ultra-thinness. As an example, the camera optical lens 10 further satisfies a condition: 0.06≤d9/TTL≤0.14.

In this embodiment, the focal length of the camera optical lens 10 is denoted by f, and the total optical length from the object side surface of the first lens L1 to the image plane of the camera optical lens 10 along the optic axis is defined as TTL. The camera optical lens 10 further satisfies a condition: f/TTL≥1.00, thereby achieving ultra-thinness.

In this embodiment, the total optical length TTL of the camera optical lens 10 is smaller than or equal to 8.59 mm, which is beneficial for achieving ultra-thin lenses. As an example, the total optical length TTL of the camera optical lens 10 is smaller than or equal to 8.20 mm.

In this embodiment, an F number (FNO) of the camera optical lens 10 is smaller than or equal to 2.47, thereby leading to a large aperture and high imaging performance. In an example, the F number (FNO) of the camera optical lens 10 is smaller than or equal to 2.42.

When the above conditions are satisfied, the camera optical lens 10 has good optical performance, and adopting a free-form surface can achieve matching of a design image area with an actual use area, to maximize the image quality of an effective area; with these characteristics, the camera optical lens 10 is especially suitable for a mobile phone camera lens assembly and a WEB camera lens composed of imaging elements such as CCD and CMOS for high pixels.

In the following, examples will be used to describe the camera optical lens 10 of the present invention. The symbols recorded in each example will be described as follows. The focal length, on-axis distance, central curvature radius, and on-axis thickness are all expressed in unit of mm.

TTL: total optical length (an on-axis distance from the object side surface of the first lens L1 to the image plane of the camera optical lens along the optic axis) in unit of mm.

F number (FNO): a ratio of an effective focal length of the camera optical lens to an entrance pupil diameter of the camera optical lens.

Table 1 shows design data of the camera optical lens 10 according to Embodiment 1 of the present invention. The object side surface and the image side surface of the fifth lens L5 are free-form surfaces.

TABLE 1

|  | R | d |  | nd |  | vd |
|---|---|---|---|---|---|---|
| S1 | ∞ | d0 = | −0.433 |  |  |  |
| R1 | 1.811 | d1 = | 0.935 | nd1 1.5444 | v1 | 55.82 |
| R2 | −11.930 | d2 = | 0.341 |  |  |  |
| R3 | −5.941 | d3 = | 0.249 | nd2 1.6610 | v2 | 20.53 |
| R4 | 3.129 | d4 = | 0.497 |  |  |  |
| R5 | 6.702 | d5 = | 0.485 | nd3 1.6610 | v3 | 20.53 |
| R6 | −13.472 | d6 = | 0.833 |  |  |  |
| R7 | 6.218 | d7 = | 0.371 | nd4 1.5444 | v4 | 55.82 |
| R8 | 3.700 | d8 = | 0.827 |  |  |  |
| R9 | −3.831 | d9 = | 0.587 | nd5 1.5444 | v5 | 55.82 |
| R10 | −19.293 | d10 = | 0.238 |  |  |  |
| R11 | ∞ | d11 = | 0.210 | ndg 1.5168 | vg | 64.17 |
| R12 | ∞ | d12 = | 0.204 |  |  |  |

In the table, the symbols are defined as follows.
S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of an object side surface of the optical filter GF;
R12: central curvature radius of an image side surface of the optical filter GF;
d: on-axis thickness of a lens, an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows aspheric surface data of respective lens in the camera optical lens 10 according to Embodiment 1 of the present invention.

TABLE 2

|  | Cone coefficient | Aspherical coefficient | | | | |
|---|---|---|---|---|---|---|
|  | k | A4 | A6 | A8 | A10 | A12 |
| R1 | 8.2132E−03 | −1.9036E−03 | 2.8968E−03 | −4.7666E−03 | 4.7195E−03 | −1.2770E−03 |
| R2 | 8.9003E+01 | 3.6335E−02 | −6.5660E−03 | 9.4637E−03 | −3.4330E−03 | −2.0327E−03 |
| R3 | 2.3323E+01 | 7.6515E−02 | 8.6384E−03 | −2.5759E−02 | −2.5989E−03 | 9.2874E−03 |
| R4 | 3.8433E+00 | 9.1345E−03 | 7.5192E−02 | −6.3858E−02 | −5.0771E−03 | 2.2625E−02 |
| R5 | −1.1990E+02 | −3.7757E−02 | 2.6953E−02 | 7.5510E−03 | 3.9620E−03 | −5.4690E−03 |
| R6 | 7.3124E+01 | −8.1933E−02 | 5.5401E−02 | −1.3958E−02 | 3.6908E−03 | 2.6274E−03 |
| R7 | 1.5821E+01 | −1.8148E−01 | 2.0492E−02 | 6.5868E−03 | −5.3405E−03 | 3.9722E−03 |
| R8 | 2.4639E+00 | −1.2467E−01 | 2.5568E−02 | 1.6938E−03 | −7.6584E−04 | −6.2533E−04 |

|  | Cone coefficient | Aspherical coefficient | | | |
|---|---|---|---|---|---|
|  | k | A14 | A16 | A18 | A20 |
| R1 | 8.2132E−03 | −5.2540E−04 | 2.1370E−04 | 6.5934E−05 | −2.9382E−05 |
| R2 | 8.9003E+01 | −9.0168E−04 | 1.5627E−03 | 9.4614E−04 | −6.2180E−04 |
| R3 | 2.3323E+01 | 1.8049E−03 | 4.3216E−04 | −7.6675E−04 | −3.0976E−04 |
| R4 | 3.8433E+00 | 6.7339E−03 | −5.5010E−03 | −1.7612E−03 | −3.2635E−04 |

TABLE 2-continued

| | | | | | |
|---|---|---|---|---|---|
| R5 | −1.1990E+02 | −2.1947E−03 | 2.0721E−03 | 1.0069E−03 | −8.1127E−04 |
| R6 | 7.3124E+01 | −2.3573E−03 | 9.4801E−04 | −2.9722E−04 | −6.5043E−05 |
| R7 | 1.5821E+01 | −1.9211E−03 | 2.1227E−04 | −7.5659E−05 | 8.4177E−06 |
| R8 | 2.4639E+00 | 2.4305E−04 | −5.3408E−05 | 2.1061E−05 | −4.1501E−06 |

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

In the equation (1), k represents a cone coefficient, and A4, A6, A8, A10, A12, A14, A16, A18 and A20 represent aspherical coefficients, c represents a curvature at the center of an optical surface, r represents a vertical distance between a point on an aspherical curve and the optic axis, and z represents an aspherical depth (a vertical distance between a point on an aspherical surface, having a distance of r from the optic axis, and a surface tangent to a vertex of the aspherical surface on the optic axis).

For convenience, an aspherical surface of each lens adopts the aspherical surface shown in the above equation (1). However, the present invention is not limited to the aspherical surface polynomial form shown in the equation (1).

Table 3 shows free-form surface data in the camera optical lens 10 of Embodiment 1 of the present invention.

$$z = \frac{cr^2}{1 + \sqrt{1 - (1+k)c^2r^2}} + \sum_{i=1}^{N} B_i E_i(x, y) \quad (2)$$

In the equation (2), k represents a cone coefficient, Bi represents an aspherical coefficient, c represents a central curvature of an optical surface, r represents a vertical distance between a point on a free-form surface and the optic axis, x represents an x-direction component of r, y represents a y-direction component of r, and z represents an aspherical depth (a vertical distance between a point on an aspherical surface, having a distance of r from the optic axis, and a surface tangent to a vertex of the aspherical surface on the optic axis).

For convenience, each free-form surface uses an extended polynomial surface shown in the above formula (2). However, the present invention is not limited to the free-form surface polynomial form expressed by the formula (2).

TABLE 3

Free-form surface coefficient

| | k | $X^4Y^0$ | $X^2Y^2$ | $X^0Y^4$ | $X^6Y^0$ | $X^4Y^2$ | $X^2Y^4$ | $X^0Y^6$ |
|---|---|---|---|---|---|---|---|---|
| R9 | 2.0826E−01 | −8.8409E−04 | −1.6015E−03 | −1.0831E−04 | 7.5852E−03 | 2.2487E−02 | 2.2669E−02 | 8.2847E−03 |
| R10 | −9.4088E+02 | −5.0313E−02 | −1.0154E−01 | −4.9262E−02 | 1.4544E−02 | 4.3827E−02 | 4.3993E−02 | 1.5281E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R9 | −1.9288E−03 | −9.2042E−04 | −2.2035E−04 | 6.2266E−05 | 3.6805E−04 | 9.1609E−04 | 1.2279E−03 | 9.2946E−04 |
| R10 | 7.0389E−04 | 3.6964E−04 | 6.7642E−05 | 6.6405E−06 | 3.0687E−05 | 7.5628E−05 | 1.0191E−04 | 7.9289E−05 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R9 | 2.0834E−04 | 1.7861E−05 | −4.1821E−06 | −3.3861E−05 | −1.2006E−04 | −2.3939E−04 | −2.9836E−04 | −2.3845E−04 |
| R10 | −5.3515E−06 | −1.9258E−06 | 1.0027E−06 | 7.3681E−06 | 2.5741E−05 | 5.0713E−05 | 6.3535E−05 | 5.2355E−05 |

| | $X^8Y^{10}$ | $X^6Y^{12}$ | $X^4Y^{14}$ | $X^2Y^{16}$ | $X^0Y^{18}$ | $Y^{20}Y^0$ | $X^{18}Y^2$ | $X^{16}Y^4$ |
|---|---|---|---|---|---|---|---|---|
| R9 | 6.6388E−05 | 4.3448E−05 | 1.5377E−05 | 1.9781E−06 | 4.5900E−07 | −9.6944E−08 | −8.5129E−07 | −4.2386E−06 |
| R10 | 1.8229E−06 | 1.9797E−06 | 1.9014E−06 | 1.3417E−06 | 1.1247E−08 | −2.2250E−08 | −1.0735E−07 | −4.2696E−07 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R9 | −1.5723E−03 | −6.3340E−03 | −9.4945E−03 | −6.2101E−03 | −1.5977E−03 | −1.9141E−04 | −9.7378E−04 | −1.9550E−03 |
| R10 | −2.5487E−03 | −1.0160E−02 | −1.5236E−02 | −1.0083E−02 | −2.5024E−03 | 7.0175E−05 | 3.4837E−04 | 6.9710E−04 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R9 | 5.3210E−04 | 5.6911E−05 | 1.9260E−05 | 1.3284E−04 | 3.9602E−04 | 6.6229E−04 | 6.6434E−04 | 4.0229E−04 |
| R10 | 4.5277E−05 | 4.6070E−06 | −9.9328E−07 | −1.1458E−05 | −3.4304E−05 | −5.9316E−05 | −5.7549E−05 | −2.9590E−05 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R9 | −1.1854E−04 | −2.7657E−05 | −4.6027E−06 | 5.3820E−07 | 4.9028E−06 | 1.8801E−05 | 4.4063E−05 | 6.6611E−05 |
| R10 | 2.7464E−05 | 9.3778E−06 | 8.7221E−07 | 1.1186E−08 | 1.2334E−07 | 5.5888E−07 | 1.0544E−06 | 1.4477E−06 |

| | $X^{14}Y^6$ | $X^{12}Y^8$ | $Y^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R9 | −1.1261E−05 | −1.9459E−05 | −2.3407E−05 | −1.9779E−05 | −1.2097E−05 | −7.3150E−06 | 1.8017E−06 | −2.5326E−08 |
| R10 | −1.2304E−06 | −2.2659E−06 | −2.6148E−06 | −1.8045E−06 | 1.4668E−06 | −1.1929E−06 | 1.2556E−06 | −1.5751E−08 |

Figure 2:
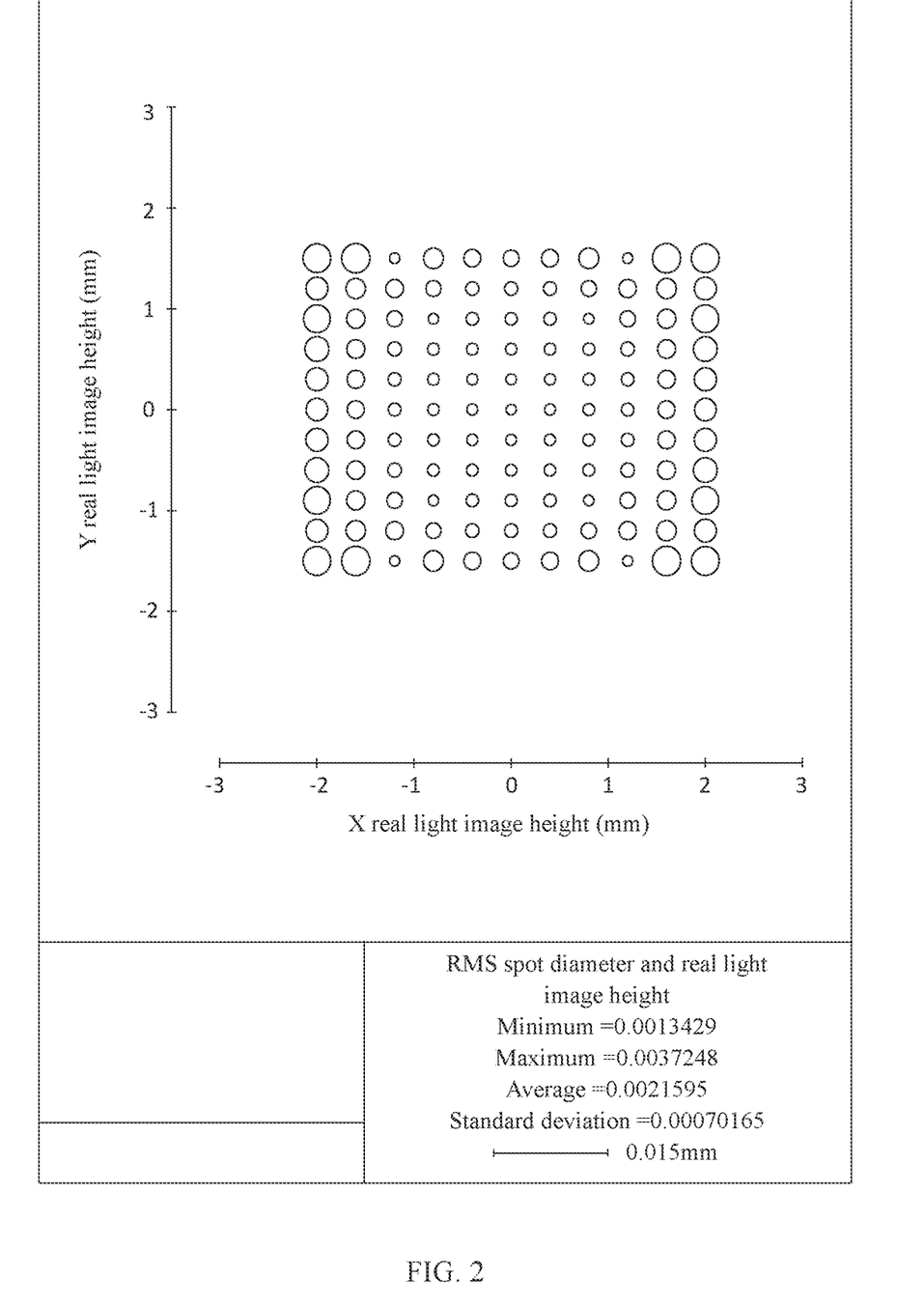
FIG. 2 illustrates a situation where an RMS spot diameter of the camera optical lens shown in FIG. 1 is within a first quadrant.

FIG. 2 shows a case where an RMS spot diameter of the camera optical lens 10 of Embodiment 1 is within a first quadrant. According to FIG. 2, it can be known that the camera optical lens 10 of Embodiment 1 can achieve good imaging quality.

Value corresponding to the various parameters and the parameters specified in the conditions for this embodiment are listed in Table 13 below.

As shown in Table 13, Embodiment 1 satisfies the respective conditions.

In this embodiment, the entrance pupil diameter ENPD of the camera optical lens is 2.428 mm. The full field of view image height (along a diagonal direction) IH is 5.000 mm, an image height in the x direction is 4.000 mm, an image height in the y direction is 3.000 mm, and the imaging effect is the best in this rectangular range. The FOV (field of view) along a diagonal direction is 45.53°, an FOV in the x direction is 37.30°, and an FOV in the y direction is 28.58°. Thus, the camera optical lens 10 satisfies design requirements of a long focal length and ultra-thinness while having the on-axis and off-axis aberrations sufficiently corrected, thereby leading to better optical characteristics.

Embodiment 2

Figure 3:
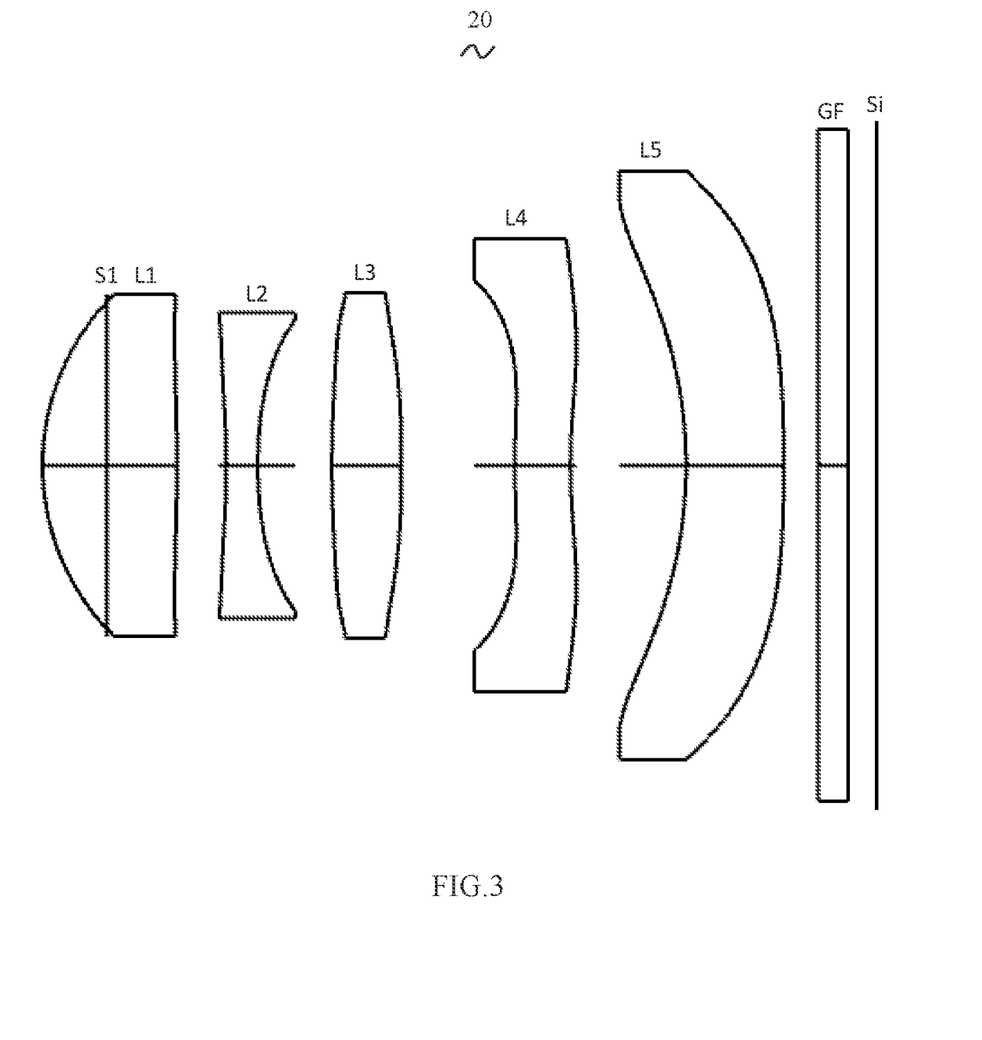
FIG. 3 is a schematic structural diagram of a camera optical lens according to Embodiment 2 of the present invention.

FIG. 3 shows a camera optical lens 20 according to Embodiment 2 of the present invention. Embodiment 2 is basically the same as Embodiment 1 and involves symbols having the same meanings as Embodiment 1. Only differences therebetween will be described in the following.

Table 4 shows design data of a camera optical lens 20 in Embodiment 2 of the present invention. The object side surface and image side surface of the first lens L1 are free-form surfaces.

TABLE 4

|  | R | d |  | nd |  | vd |
|---|---|---|---|---|---|---|
| S1 | ∞ | d0 = | −0.450 |  |  |  |
| R1 | 1.815 | d1 = | 0.943 | nd1 | 1.5444 v1 | 55.82 |
| R2 | −12.038 | d2 = | 0.346 |  |  |  |
| R3 | −5.986 | d3 = | 0.221 | nd2 | 1.6610 v2 | 20.53 |
| R4 | 3.144 | d4 = | 0.520 |  |  |  |
| R5 | 6.766 | d5 = | 0.488 | nd3 | 1.6610 v3 | 20.53 |
| R6 | −14.168 | d6 = | 0.796 |  |  |  |
| R7 | 6.289 | d7 = | 0.389 | nd4 | 1.5444 v4 | 55.82 |
| R8 | 3.947 | d8 = | 0.812 |  |  |  |
| R9 | −3.485 | d9 = | 0.686 | nd5 | 1.5444 v5 | 55.82 |
| R10 | −14.912 | d10 = | 0.238 |  |  |  |
| R11 | ∞ | d11 = | 0.210 | ndg | 1.5168 vg | 64.17 |
| R12 | ∞ | d12 = | 0.205 |  |  |  |

Table 5 shows aspheric surface data of respective lenses in the camera optical lens 20 according to Embodiment 2 of the present invention.

TABLE 5

| | Cone coefficient | Aspherical coefficient | | | | |
|---|---|---|---|---|---|---|
| | k | A4 | A6 | A8 | A10 | A12 |
| R3 | 2.2970E+01 | 7.4824E−02 | 8.3218E−03 | −2.6219E−02 | −2.7523E−03 | 9.3063E−03 |
| R4 | 3.7833E+00 | 9.0719E−03 | 7.5367E−02 | −6.3869E−02 | −5.4545E−03 | 2.2160E−02 |
| R5 | −1.1565E+02 | −3.6338E−02 | 2.7447E−02 | 7.3803E−03 | 3.6628E−03 | −5.4195E−03 |
| R6 | 7.4254E+01 | −8.1618E−02 | 5.4335E−02 | −1.3784E−02 | 3.8786E−03 | 2.5668E−03 |
| R7 | 1.5020E+01 | −1.7779E−01 | 2.1876E−02 | 6.8388E−03 | −5.8170E−03 | 3.7598E−03 |
| R8 | 2.5314E+00 | −1.2269E−01 | 2.5836E−02 | 1.9606E−03 | −6.8207E−04 | −6.1865E−04 |
| R9 | 6.1968E−01 | −8.2418E−03 | 8.1733E−03 | −1.4432E−03 | −1.5743E−04 | 7.2566E−05 |
| R10 | −5.7312E+02 | −5.3348E−02 | 1.3538E−02 | −2.4620E−03 | 1.0048E−04 | 6.9268E−06 |

| | Cone coefficient | Aspherical coefficient | | | |
|---|---|---|---|---|---|
| | k | A14 | A16 | A18 | A20 |
| R3 | 2.2970E+01 | 1.7411E−03 | 2.2785E−04 | −9.4155E−04 | −2.2348E−04 |
| R4 | 3.7833E+00 | 6.6682E−03 | −5.1567E−03 | −1.3876E−03 | −6.0708E−04 |
| R5 | −1.1565E+02 | −2.1801E−03 | 2.0211E−03 | 9.6484E−04 | −7.3917E−04 |
| R6 | 7.4254E+01 | −2.5285E−03 | 8.4228E−04 | −2.9673E−04 | −1.2095E−05 |
| R7 | 1.5020E+01 | −1.9016E−03 | 2.7550E−04 | −6.4389E−05 | −2.4361E−05 |
| R8 | 2.5314E+00 | 2.3825E−04 | −5.5462E−05 | 2.1117E−05 | −4.0841E−06 |
| R9 | 6.1968E−01 | 2.1616E−05 | −3.9777E−06 | 4.5347E−07 | −1.6795E−07 |
| R10 | −5.7312E+02 | −2.2536E−06 | 7.0180E−07 | −6.8666E−09 | −1.3896E−09 |

Table 6 shows free-form surface data in the camera optical lens 20 of Embodiment 2 of the present invention.

TABLE 6

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | 1.2077E−02 | −1.4530E−03 | −2.8986E−03 | −1.3815E−03 | 3.1071E−03 | 9.4180E−03 | 9.2281E−03 | 3.1925E−03 |
| R2 | 8.6344E+01 | 3.6245E−02 | 7.2422E−02 | 3.6511E−02 | −6.9969E−03 | −2.0900E−02 | −2.1280E−02 | −7.1514E−03 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | 4.6653E−02 | 2.3582E−02 | 4.6551E−03 | −1.2757E−03 | −7.7020E−03 | −1.9134E−02 | −2.5626E−02 | −1.9325E−02 |
| R2 | −3.1903E−02 | −1.5912E−02 | −3.1940E−03 | −1.9297E−03 | −1.1370E−02 | −2.8920E−02 | −3.7804E−02 | −2.8393E−02 |

TABLE 6-continued

| Free-form surface coefficient | | | | | | | |
|---|---|---|---|---|---|---|---|
| $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |

| | | | | | | | | |
|---|---|---|---|---|---|---|---|---|
| R1 | −3.5665E−03 | −4.9389E−04 | 2.4987E−04 | 1.8619E−03 | 6.8403E−03 | 1.3359E−02 | 1.7020E−02 | 1.3674E−02 |
| R2 | −6.1049E−03 | −9.4569E−04 | 1.4817E−03 | 1.2170E−02 | 4.0168E−02 | 8.2139E−02 | 1.0184E−01 | 8.2536E−02 |

| $X^8Y^{10}$ | $X^6Y^{12}$ | $X^4Y^{14}$ | $X^2Y^{16}$ | $X^0Y^{18}$ | $Y^{20}Y^0$ | $X^{18}Y^2$ | $X^{16}Y^4$ |
|---|---|---|---|---|---|---|---|

| | | | | | | | | |
|---|---|---|---|---|---|---|---|---|
| R1 | 9.7040E−03 | 6.6948E−03 | 2.6213E−03 | 6.5685E−04 | 8.1623E−05 | −4.3259E−05 | −3.5177E−04 | −1.8384E−03 |
| R2 | 1.1126E−01 | 7.3463E−02 | 2.8938E−02 | 7.8698E−03 | 8.5633E−04 | −6.2046E−04 | −6.4826E−03 | −2.6857E−02 |

| $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|

| | | | | | | | | |
|---|---|---|---|---|---|---|---|---|
| R1 | −4.7611E−03 | −1.8828E−02 | −2.8878E−02 | −1.8743E−02 | −4.7625E−03 | 4.6787E−03 | 2.3522E−02 | 4.6754E−02 |
| R2 | 9.5034E−03 | 3.8014E−02 | 5.7372E−02 | 3.7835E−02 | 9.5061E−03 | −3.2340E−03 | −1.6147E−02 | −3.2682E−02 |

| $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|

| | | | | | | | | |
|---|---|---|---|---|---|---|---|---|
| R1 | −7.6795E−03 | −1.2940E−03 | −4.8900E−04 | −3.5806E−03 | −1.0356E−02 | −1.7423E−02 | −1.7499E−02 | −1.0571E−02 |
| R2 | −1.1146E−02 | −1.8917E−03 | −9.3261E−04 | −6.3196E−03 | −2.0425E−02 | −3.2816E−02 | −3.1890E−02 | −2.0656E−02 |

| $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|

| | | | | | | | | |
|---|---|---|---|---|---|---|---|---|
| R1 | 6.7272E−03 | 1.8266E−03 | 2.5056E−04 | 7.4138E−05 | 6.6724E−04 | 2.9204E−03 | 6.3660E−03 | 9.7889E−03 |
| R2 | 3.8049E−02 | 1.2006E−02 | 1.4337E−03 | 8.9589E−04 | 8.0630E−03 | 3.0832E−02 | 7.4217E−02 | 1.0879E−01 |

| $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|

| | | | | | | | | |
|---|---|---|---|---|---|---|---|---|
| R1 | −5.4783E−03 | −7.7753E−03 | −1.1514E−02 | −7.6510E−03 | −5.2119E−03 | −1.5852E−03 | −3.5510E−04 | −4.5926E−05 |
| R2 | −7.0262E−02 | −1.3167E−01 | −1.4560E−01 | −1.3243E−01 | −6.8289E−02 | −2.4798E−02 | −6.4393E−03 | −5.8239E−04 |

Figure 4:
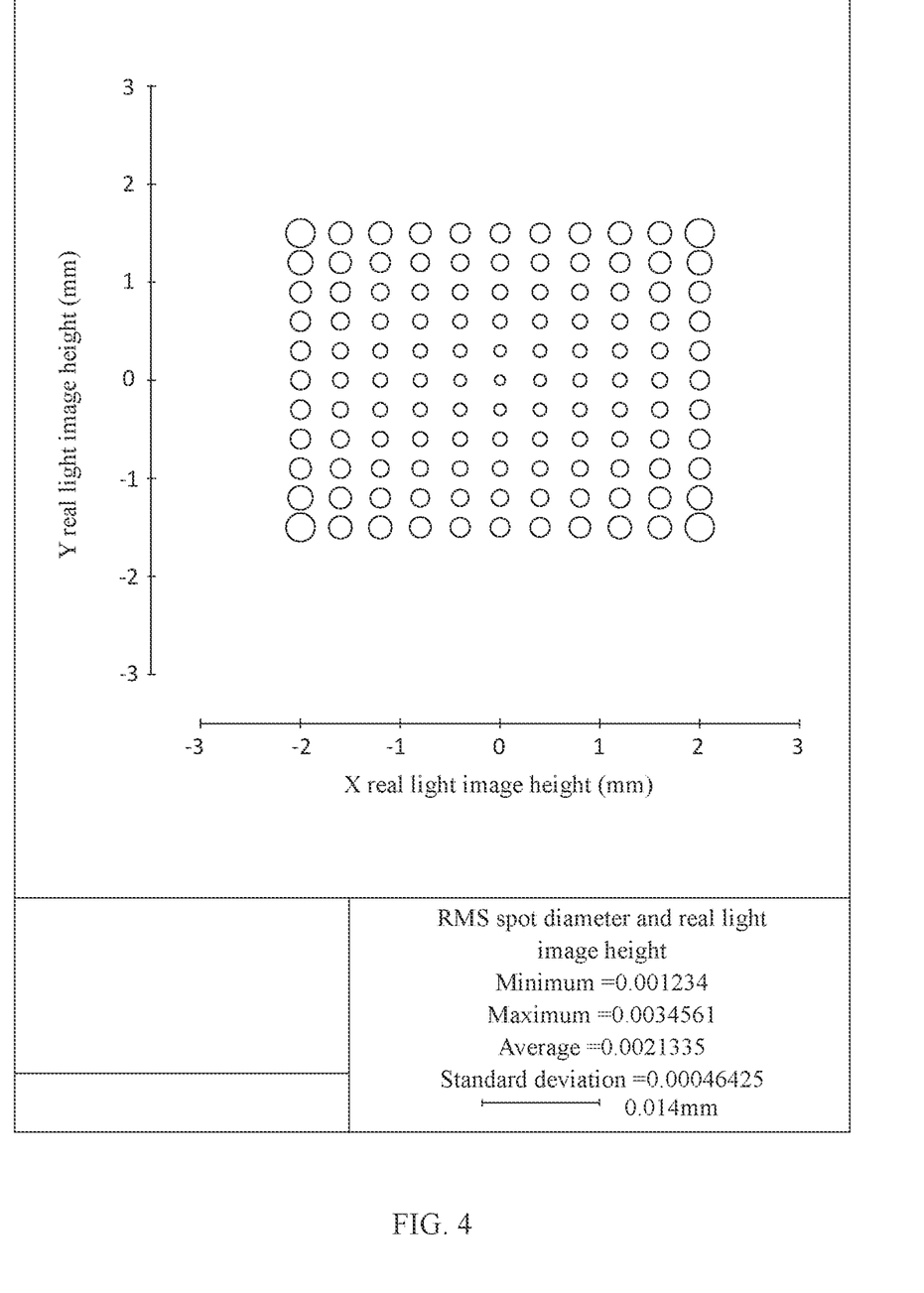
FIG. 4 illustrates a situation where an RMS spot diameter of the camera optical lens shown in FIG. 3 is within a first quadrant.

FIG. 4 shows a situation where an RMS spot diameter of the camera optical lens 20 of Embodiment 2 is within a first quadrant. According to FIG. 4, it can be known that the camera optical lens 20 of Embodiment 2 can achieve good imaging quality.

As shown in Table 13, Embodiment 2 satisfies the respective conditions.

In this embodiment, the entrance pupil diameter ENPD of the camera optical lens is 2.462 mm. The full field of view image height (along a diagonal direction) IH is 5.000 mm, an image height in the x direction is 4.000 mm, an image height in the y direction is 3.000 mm, and the imaging effect is the best in this rectangular range. The FOV (field of view) along a diagonal direction is 45.15°, an FOV in the x direction is 36.93°, and an FOV in the y direction is 28.28°. Thus, the camera optical lens 20 satisfies design requirements of ultra-thinness and a long focal length while having on-axis and off-axis aberrations sufficiently corrected, thereby leading to better optical characteristics.

Embodiment 3

Figure 5:
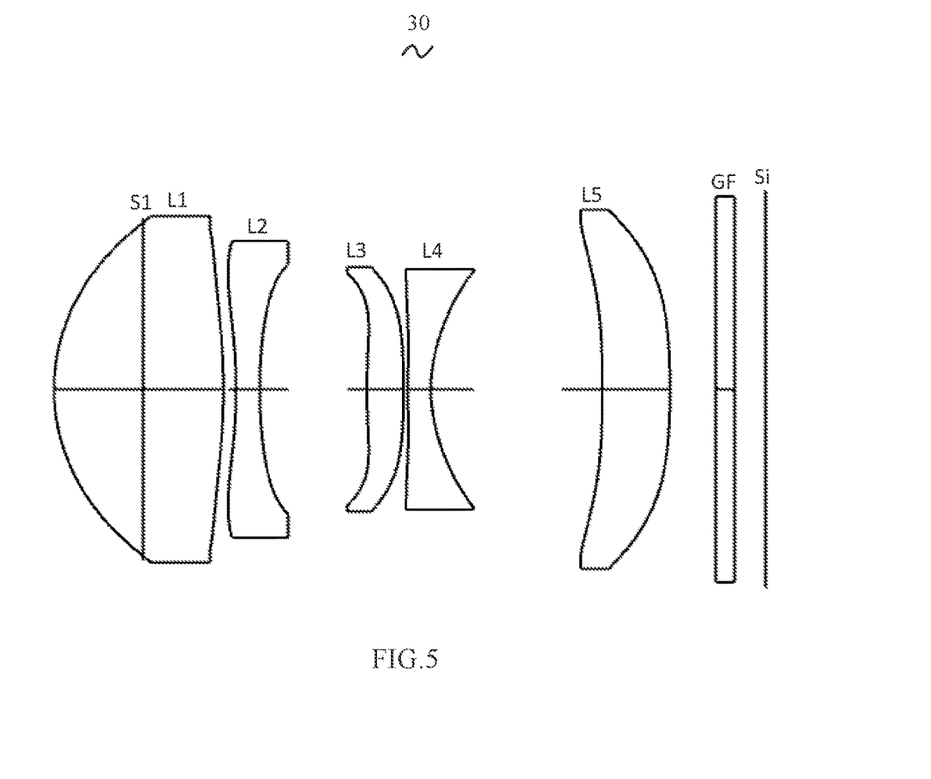
FIG. 5 is a schematic structural diagram of a camera optical lens according to Embodiment 2 of the present invention.

FIG. 5 shows a camera optical lens 30 according to Embodiment 3 of the present invention. Embodiment 3 is basically the same as Embodiment 1 and involves symbols having the same meanings as Embodiment 1. Only differences from Embodiment 1 will be described in the following.

In this embodiment, the fifth lens L5 has a positive refractive power.

Table 7 shows design data of a camera optical lens 30 in Embodiment 3 of the present invention.

TABLE 7

| | R | d | | nd | | vd | |
|---|---|---|---|---|---|---|---|
| S1 | ∞ | d0 = | −0.979 | | | | |
| R1 | 2.305 | d1 = | 1.859 | nd1 | 1.5438 | v1 | 56.03 |
| R2 | −8.620 | d2 = | 0.136 | | | | |
| R3 | −8.034 | d3 = | 0.261 | nd2 | 1.6610 | v2 | 20.53 |
| R4 | 5.306 | d4 = | 1.177 | | | | |
| R5 | 7.142 | d5 = | 0.400 | nd3 | 1.6610 | v3 | 20.53 |
| R6 | −18.389 | d6 = | 0.050 | | | | |
| R7 | 6.212 | d7 = | 0.250 | nd4 | 1.5438 | v4 | 56.03 |
| R8 | 1.609 | d8 = | 1.885 | | | | |
| R9 | −16.816 | d9 = | 0.743 | nd5 | 1.5346 | v5 | 55.69 |
| R10 | −12.180 | d10 = | 0.500 | | | | |
| R11 | ∞ | d11 = | 0.210 | ndg | 1.5168 | vg | 64.17 |
| R12 | ∞ | d12 = | 0.340 | | | | |

Table 8 shows aspheric surface data of respective lenses in the camera optical lens 30 according to Embodiment 3 of the present invention.

TABLE 8

| | Cone coefficient | Aspherical coefficient | | | | | |
|---|---|---|---|---|---|---|---|
| | k | A4 | A6 | A8 | A10 | A12 | |
| R1 | −9.1538E−02 | −4.0215E−04 | 5.243 1E−04 | −9.4662E−04 | 7.7483E−04 | −3.4918E−04 | |
| R2 | 1.3009E+01 | −3.1679E−02 | 7.0681E−02 | −5.8494E−02 | 2.9357E−02 | −8.9782E−03 | |
| R3 | −1.0090E+01 | −8.3874E−02 | 1.7640E−01 | −1.7249E−01 | 1.0691E−01 | −4.2104E−02 | |
| R4 | 8.7318E+00 | −6.0068E−02 | 1.1886E−01 | −1.1896E−01 | 7.6527E−02 | −2.9406E−02 | |

TABLE 8-continued

| | | | | | |
|---|---|---|---|---|---|
| R5 | −2.7122E+01 | −3.2692E−02 | −4.9415E−02 | 3.7328E−02 | −6.5007E−02 | 5.6442E−02 |
| R6 | −1.0000E+01 | −1.1090E−01 | 1.4936E−01 | −2.3844E−01 | 2.0151E−01 | −9.6292E−02 |
| R7 | −7.0667E+00 | −3.0669E−01 | 5.4625E−01 | −6.5146E−01 | 5.2652E−01 | −2.6882E−01 |
| R8 | −7.0552E+00 | −3.6763E−02 | 1.7688E−01 | −2.1424E−01 | 1.6601E−01 | −8.3681E−02 |

| | Cone coefficient | Aspherical coefficient | | | |
|---|---|---|---|---|---|
| | k | A14 | A16 | A18 | A20 |
| R1 | −9.1538E−02 | 7.8925E−05 | −7.5351E−06 | 0.0000E+00 | 0.0000E+00 |
| R2 | 1.3009E+01 | 1.5199E−03 | −1.0887E−04 | 0.0000E+00 | 0.0000E+00 |
| R3 | −1.0090E+01 | 1.0072E−02 | −1.3020E−03 | 6.7214E−05 | 0.0000E+00 |
| R4 | 8.7318E+00 | 6.1046E−03 | −4.4860E−04 | 0.0000E+00 | 0.0000E+00 |
| R5 | −2.7122E+01 | −2.3439E−02 | 3.8979E−03 | 0.0000E+00 | 0.0000E+00 |
| R6 | −1.0000E+01 | 2.4193E−02 | −2.4021E−03 | 0.0000E+00 | 0.0000E+00 |
| R7 | −7.0667E+00 | 7.7614E−02 | −9.9554E−03 | 1.5147E−04 | 0.0000E+00 |
| R8 | −7.0552E+00 | 2.4452E−02 | −3.0855E−03 | 0.0000E+00 | 0.0000E+00 |

Table 9 shows free-form surface data in the camera optical lens 30 of Embodiment 3 of the present invention.

TABLE 9

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R9 | 9.9903E+00 | −2.9340E−02 | −5.8237E−02 | −2.8974E−02 | 1.0690E−02 | 3.1822E−02 | 3.2380E−02 | 1.0632E−02 |
| R10 | 6.8871E+00 | −4.3489E−02 | −8.6816E−02 | −4.2873E−02 | 8.7747E−03 | 2.6475E−02 | 2.7112E−02 | 8.7270E−03 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R9 | −5.9295E−03 | −2.9641E−03 | −6.1454E−04 | 8.9871E−04 | 5.3940E−03 | 1.3421E−02 | 1.7923E−02 | 1.3520E−02 |
| R10 | −6.6098E−02 | −3.3000E−02 | −6.6118E−03 | 4.3241E−03 | 2.5963E−02 | 6.4899E−02 | 8.6495E−02 | 6.4952E−02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R9 | −2.3048E−03 | −3.2028E−04 | 5.5239E−05 | 4.4180E−04 | 1.5435E−03 | 3.0885E−03 | 3.8569E−03 | 3.0894E−03 |
| R10 | −1.0912E−02 | −1.5540E−03 | 3.3052E−04 | 2.6432E−03 | 9.2509E−03 | 1.8502E−02 | 2.3129E−02 | 1.8494E−02 |
| | $X^8Y^{10}$ | $X^6Y^{12}$ | $X^4Y^{14}$ | $X^2Y^{16}$ | $X^0Y^{18}$ | $Y^{20}Y^0$ | $X^{18}Y^2$ | $X^{16}Y^4$ |
| R9 | −4.3164E−04 | −2.9236E−04 | −1.2467E−04 | −3.5095E−05 | −6.3317E−06 | 0.0000E+00 | 0.0000E+00 | 0.0000E+00 |
| R10 | −4.9070E−03 | −3.2736E−03 | −1.4018E−03 | −3.5194E−04 | −3.8698E−05 | 1.9897E−06 | 1.9850E−05 | 8.9662E−05 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R9 | −2.5850E−03 | −1.0262E−02 | −1.5417E−02 | −1.0146E−02 | −2.6202E−03 | −5.9593E−04 | −2.9939E−03 | −6.0732E−03 |
| R10 | 3.0000E−03 | 1.1676E−02 | 1.7682E−02 | 1.1764E−02 | 2.8483E−03 | −6.6246E−03 | −3.3056E−02 | −6.6299E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R9 | 5.4267E−03 | 9.1576E−04 | −3.3385E−04 | −2.3332E−03 | −7.0232E−03 | −1.1711E−02 | −1.1695E−02 | −6.9713E−03 |
| R10 | 2.5982E−02 | 4.3406E−03 | −1.5587E−03 | −1.0909E−02 | −3.2732E−02 | −5.4550E−02 | −5.4564E−02 | −3.2716E−02 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R9 | 1.5586E−03 | 4.4868E−04 | 5.8513E−05 | −3.3862E−06 | −3.0788E−05 | −1.2341E−04 | −2.8405E−04 | −4.2562E−04 |
| R10 | 9.2534E−03 | 2.6380E−03 | 3.3180E−04 | −3.8909E−05 | −3.5055E−04 | −1.4020E−03 | −3.2728E−03 | −4.9080E−03 |
| | $X^{14}Y^6$ | $X^{12}Y^8$ | $Y^{10}Y^{10}$ | $X^8Y^{12}$ | $X^6Y^{14}$ | $X^4Y^{16}$ | $X^2Y^{18}$ | $X^0Y^{20}$ |
| R9 | 0.0000E+00 | 0.0000E+00 | 0.0000E+00 | 0.0000E+00 | 0.0000E+00 | 0.0000E+00 | 0.0000E+00 | 0.0000E+00 |
| R10 | 2.3809E−04 | 4.1644E−04 | 5.0111E−04 | 4.2011E−04 | 2.4054E−04 | 9.1519E−05 | 2.0324E−05 | 1.7526E−06 |

Figure 6:
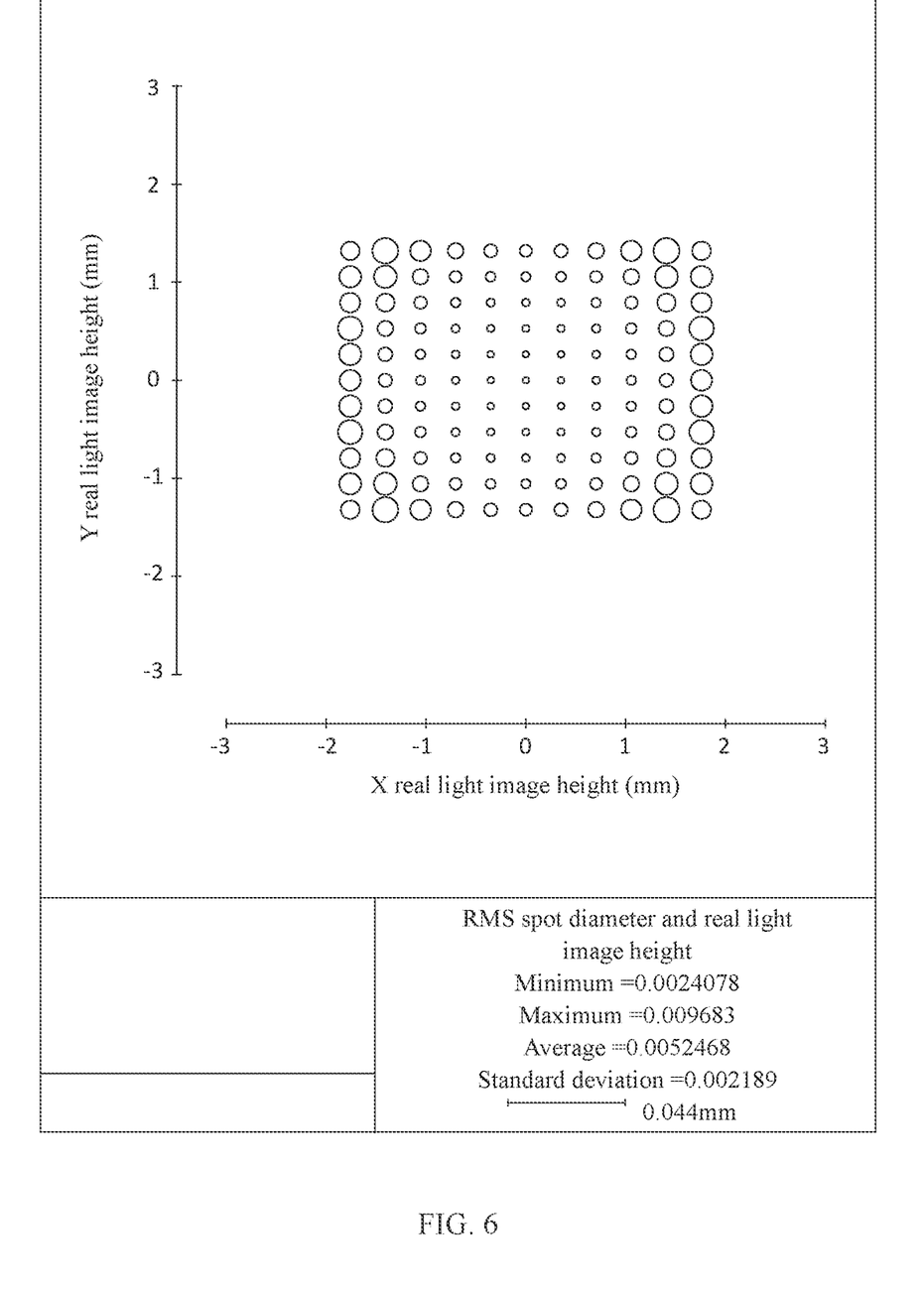
FIG. 6 illustrates a situation where an RMS spot diameter of the camera optical lens shown in FIG. 1 is within a first quadrant.

FIG. 6 shows a situation where an RMS spot diameter of the camera optical lens 30 of Embodiment 3 is within a first quadrant. According to FIG. 6, it can be known that the camera optical lens 30 of Embodiment 3 can achieve good imaging quality.

Table 13 below further lists values corresponding to various conditions in this embodiment according to the above conditions. It can be seen that the camera optical lens according to this embodiment satisfies the above conditions.

In this embodiment, the entrance pupil diameter ENPD of the camera optical lens is 3.969 mm. The full field of view image height (along a diagonal direction) IH is 4.400 mm, an image height in the x direction is 3.520 mm, an image height in the y direction is 2.640 mm, and the imaging effect is the best in this rectangular range. The FOV (field of view) along a diagonal direction is 27.43°, an FOV in the x direction is 22.23°, and an FOV in the y direction is 16.87°. Thus, the camera optical lens 30 satisfies design requirements of ultra-thinness and a long focal length while having on-axis and off-axis aberrations sufficiently corrected, thereby leading to better optical characteristics.

Embodiment 4

Figure 7:
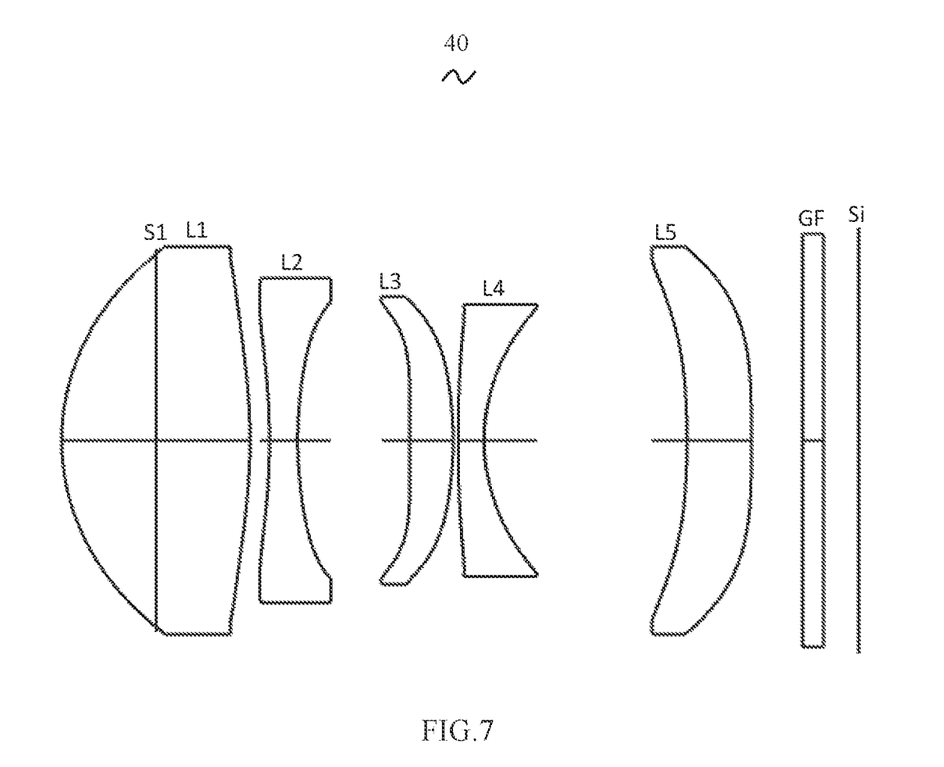
FIG. 7 is a schematic structural diagram of a camera optical lens according to Embodiment 4 of the present invention.

FIG. 7 shows a camera optical lens 40 according to Embodiment 4 of the present invention. Embodiment 4 is basically the same as Embodiment 1 and involves symbols having the same meanings as Embodiment 1. Only differences from Embodiment 1 will be described in the following.

Table 10 shows design data of the camera optical lens 40 in Embodiment 4 of the present invention. The object side surface and image side surface of the first lens L1 are free-form surfaces.

TABLE 10

|     | R       | d      |         | nd     |     | vd    |
|-----|---------|--------|---------|--------|-----|-------|
| S1  | ∞       | d0 =   | −0.921  |        |     |       |
| R1  | 2.400   | d1 =   | 1.846   | nd1    | 1.5438 | v1 | 56.03 |
| R2  | −6.568  | d2 =   | 0.190   |        |     |       |
| R3  | −9.845  | d3 =   | 0.278   | nd2    | 1.6610 | v2 | 20.53 |
| R4  | 4.057   | d4 =   | 1.097   |        |     |       |
| R5  | 102.625 | d5 =   | 0.428   | nd3    | 1.6610 | v3 | 20.53 |
| R6  | −3.237  | d6 =   | 0.050   |        |     |       |
| R7  | 76.923  | d7 =   | 0.250   | nd4    | 1.5438 | v4 | 56.03 |
| R8  | 1.861   | d8 =   | 1.987   |        |     |       |
| R9  | −10.361 | d9 =   | 0.634   | nd5    | 1.5346 | v5 | 55.69 |
| R10 | −62.500 | d10 =  | 0.500   |        |     |       |
| R11 | ∞       | d11 =  | 0.210   | ndg    | 1.5168 | vg | 64.17 |
| R12 | ∞       | d12 =  | 0.340   |        |     |       |

Table 11 shows aspheric surface data of respective lenses in the camera optical lens 40 according to Embodiment 4 of the present invention.

TABLE 11

| | Cone coefficient | Aspherical coefficient | | | | |
|---|---|---|---|---|---|---|
| | k | A4 | A6 | A8 | A10 | A12 |
| R3 | 1.0000E+01 | −5.5117E−02 | 8.3100E−02 | −5.5430E−02 | 1.8338E−02 | 1.0730E−03 |
| R4 | 4.7032E+00 | −5.9405E−02 | 7.0527E−02 | −4.7809E−02 | 1.4126E−02 | 5.4226E−03 |
| R5 | 1.0000E+01 | −1.7886E−02 | −1.0434E−02 | −9.5430E−02 | 1.3027E−01 | −8.2294E−02 |
| R6 | −8.9645E+00 | 1.5850E−01 | −4.1650E−01 | 4.5300E−01 | −3.0460E−01 | 1.2376E−01 |
| R7 | 1.0000E+01 | 1.5764E−01 | −4.0957E−01 | 5.7367E−01 | −4.5995E−01 | 2.1600E−01 |
| R8 | −6.5629E+00 | 3.4222E−02 | 3.3583E−02 | −9.6651E−03 | −1.2724E−02 | 1.1103E−02 |
| R9 | 3.3582E+00 | −4.2390E−02 | 2.2856E−02 | −1.6402E−02 | 1.0065E−02 | −3.9101E−03 |
| R10 | 1.2775E+01 | −6.1904E−02 | 2.0749E−02 | −1.0705E−02 | 3.3580E−03 | −1.3913E−04 |

| | Cone coefficient | Aspherical coefficients | | | |
|---|---|---|---|---|---|
| | k | A14 | A16 | A18 | A20 |
| R3 | 1.0000E+01 | −3.1723E−03 | 1.0244E−03 | −1.1148E−04 | 0.0000E+00 |
| R4 | 4.7032E+00 | −5.2085E−03 | 1.1532E−03 | 0.0000E+00 | 0.0000E+00 |
| R5 | 1.0000E+01 | 2.5366E−02 | −2.9043E−03 | 0.0000E+00 | 0.0000E+00 |
| R6 | −8.9645E+00 | −2.8201E−02 | 2.8351E−03 | 0.0000E+00 | 0.0000E+00 |
| R7 | 1.0000E+01 | −5.7443E−02 | 7.5044E−03 | −3.2392E−04 | 0.0000E+00 |
| R8 | −6.5629E+00 | −3.6918E−03 | 4.4282E−04 | 0.0000E+00 | 0.0000E+00 |
| R9 | 3.3582E+00 | 8.9533E−04 | −1.0874E−04 | 5.4306E−06 | 0.0000E+00 |
| R10 | 1.2775E+01 | −3.1988E−04 | 1.2138E−04 | −1.9378E−05 | 1.2283E−06 |

Table 12 shows free-form surface data in the camera optical lens 40 of Embodiment 4 of the present invention.

TABLE 12

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −8.9257E−02 | 1.1811E−04 | 2.6679E−04 | 1.0900E−04 | −3.1037E−04 | −9.8785E−04 | −9.7540E−04 | −2.8161E−04 |
| R2 | 9.0592E+00 | −6.4429E−05 | −1.9766E−04 | −6.0871E−05 | 1.9882E−02 | 6.0174E−02 | 5.9885E−02 | 1.9968E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | 4.5800E−03 | 2.3011E−03 | 4.6286E−04 | −2.7374E−04 | −1.6572E−03 | −4.1439E−03 | −5.5389E−03 | −4.1516E−03 |
| R2 | 7.5180E−02 | 3.7453E−02 | 7.5256E−03 | −2.5114E−03 | −1.4935E−02 | −3.7399E−02 | −4.9853E−02 | −3.7373E−02 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | 4.7563E−04 | 6.8253E−05 | −6.3477E−06 | −5.1728E−05 | −1.8026E−04 | −3.6383E−04 | −4.5420E−04 | −3.6243E−04 |
| R2 | 3.3831E−03 | 4.7754E−04 | −4.0068E−05 | −3.1227E−04 | −1.0972E−03 | −2.1798E−03 | −2.7308E−03 | −2.2045E−03 |

TABLE 12-continued

Free-form surface coefficients

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | −2.3308E−04 | −8.6278E−04 | −1.2730E−03 | −8.8405E−04 | −2.4252E−04 | 4.6087E−04 | 2.2911E−03 | 4.5770E−03 |
| R2 | −1.4877E−02 | −5.9976E−02 | −8.9927E−02 | −5.9546E−02 | −1.4951E−02 | 7.5161E−03 | 3.7615E−02 | 7.5364E−02 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | −1.6520E−03 | −2.7547E−04 | 6.7454E−05 | 4.7960E−04 | 1.4364E−03 | 2.4114E−03 | 2.4026E−03 | 1.4421E−03 |
| R2 | −1.4975E−02 | −2.4925E−03 | 4.8678E−04 | 3.3459E−03 | 1.0061E−02 | 1.6706E−02 | 1.6799E−02 | 1.0070E−02 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | −1.8117E−04 | −5.1109E−05 | −6.4509E−06 | 0.0000E+00 | 0.0000E+00 | 0.0000E+00 | 0.0000E+00 | 0.0000E+00 |
| R2 | −1.0984E−03 | −3.1823E−04 | −3.8820E−05 | 0.0000E+00 | 0.0000E+00 | 0.0000E+00 | 0.0000E+00 | 0.0000E+00 |

| | $X^{14}Y^6$ | $X^{12}Y^8$ | $Y^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

Figure 8:
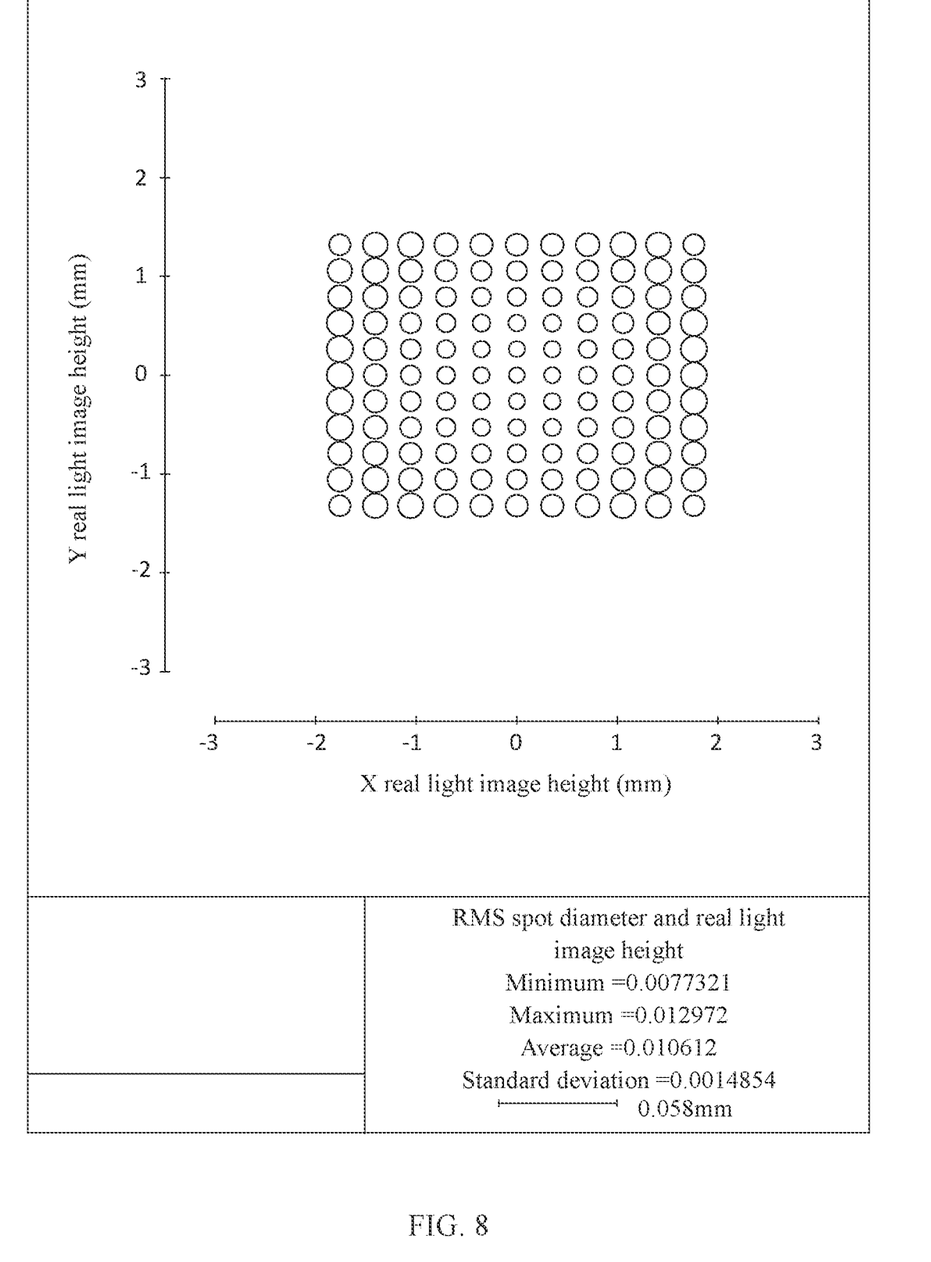
FIG. 8 illustrates a situation where an RMS spot diameter of the camera optical lens shown in FIG. 1 is within a first quadrant.

FIG. 8 shows a situation where an RMS spot diameter of the camera optical lens 40 of Embodiment 4 is within a first quadrant. According to FIG. 8, it can be known that the camera optical lens 40 of Embodiment 4 can achieve good imaging quality.

Table 13 below further lists values corresponding to various conditions in this embodiment according to the above conditions. It can be seen that the camera optical lens according to this embodiment satisfies the above conditions.

In this embodiment, the entrance pupil diameter ENPD of the camera optical lens is 3.969 mm. The full field of view image height (along a diagonal direction) IH is 4.400 mm, an image height in the x direction is 3.520 mm, an image height in the y direction is 2.640 mm, and the imaging effect is the best in this rectangular range. The FOV (field of view) along a diagonal direction is 27.91°, an FOV in the x direction is 22.49°, and an FOV in the y direction is 16.97°. Thus, the camera optical lens 40 satisfies design requirements of ultra-thinness and a long focal length while having on-axis and off-axis aberrations sufficiently corrected, thereby leading to better optical characteristics.

TABLE 13

| Parameters and conditions | Embodiment 1 | Embodiment 2 | Embodiment 3 | Embodiment 4 |
|---|---|---|---|---|
| f4/f | −3.03 | −3.49 | −0.46 | −0.40 |
| R10/f | −3.31 | −2.52 | −1.38 | −7.06 |
| d8/d7 | 2.23 | 2.09 | 7.54 | 7.95 |
| f | 5.827 | 5.909 | 8.850 | 8.850 |
| f1 | 2.947 | 2.957 | 3.547 | 3.474 |
| f2 | −3.032 | −3.054 | −4.755 | −4.275 |
| f3 | 6.759 | 6.914 | 7.763 | 4.714 |
| f4 | −17.628 | −20.601 | −4.056 | −3.499 |
| f5 | −8.861 | −8.498 | 78.020 | −23.256 |
| FNO | 2.40 | 2.40 | 2.23 | 2.23 |
| TTL | 5.777 | 5.854 | 7.811 | 7.810 |
| IH | 5.000 | 5.000 | 4.400 | 4.400 |
| FOV | 45.53° | 45.15° | 27.43° | 27.91° |

It can be known by one having ordinary skill in the art that the description above is only embodiments of the present invention. In practice, one having ordinary skill in the art can make various modifications to these embodiments in forms and details without departing from the scope of the present invention.

What is claimed is:

1. A camera optical lens, comprising, from an object side to an image side:
   a first lens having a positive refractive power;
   a second lens having a negative refractive power;
   a third lens having a positive refractive power;
   a fourth lens having a negative refractive power; and
   a fifth lens,
   wherein at least one of the first lens to the fifth lens has a free-form surface,
   wherein the camera optical lens satisfies following conditions:

$-3.50 \leq f4/f \leq -0.35$;

$-8.0 \leq R10/f \leq -1.00$;

$2.00 \leq d8/d7 \leq 8.0$;

$0.52 \leq (R7+R8)/(R7-R8) \leq 6.56$; and $0.02 \leq d7/TTL \leq 0.10$, where
   f denotes a focal length of the camera optical lens;
   f4 denotes a focal length of the fourth lens;
   R10 denotes a central curvature radius of an image side surface of the fifth lens;
   d7 denotes an on-axis thickness of the fourth lens;
   d8 denotes an on-axis distance from an image side surface of the fourth lens to an object side surface of the fifth lens;
   R7 denotes a central curvature radius of an object side surface of the fourth lens;
   R7 denotes a central curvature radius of the image side surface of the fourth lens; and
   TTL denotes a total optical length from an object side surface of the first lens to an image plane of the camera optical lens along an optic axis.

2. The camera optical lens as described in claim 1, further satisfying a following condition:

$$1.50 \leq d4/d3 \leq 5.00,$$

where d3 denotes an on-axis thickness of the second lens; and
d4 denotes an on-axis distance from an image side surface of the second lens to an object side surface of the third lens.

3. The camera optical lens as described in claim 1, further satisfying following conditions:

$$0.20 \leq f1/f \leq 0.76;$$

$$-1.48 \leq (R1+R2)/(R1-R2) \leq -0.31; \text{ and}$$

$$0.08 \leq d1/TTL \leq 0.36,$$

where
f1 denotes a focal length of the first lens;
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

4. The camera optical lens as described in claim 1, further satisfying following conditions:

$$-1.07 \leq f2/f \leq -0.32;$$

$$0.10 \leq (R3+R4)/(R3-R4) \leq 0.62; \text{ and}$$

$$0.02 \leq d3/TTL \leq 0.06$$

where
f2 denotes a focal length of the second lens;
R3 denotes a central curvature radius of an object side surface of the second lens;
R4 denotes a central curvature radius of an image side surface of the second lens;
d3 denotes an on-axis thickness of the second lens; and
TTL denotes a total optical length from an object side surface of the first lens to an image plane of the camera optical lens along an optic axis.

5. The camera optical lens as described in claim 1, further satisfying following conditions:

$$0.27 \leq f3/f \leq 1.76;$$

$$-0.88 \leq (R5+R6)/(R5-R6) \leq 1.41; \text{ and}$$

$$0.03 \leq d5/TTL \leq 0.13,$$

where
f3 denotes a focal length of the third lens;
R5 denotes a central curvature radius of an object side surface of the third lens;
R6 denotes a central curvature radius of an image side surface of the third lens;
d5 denotes an on-axis thickness of the third lens; and
TTL denotes a total optical length from an object side surface of the first lens to an image plane of the camera optical lens along an optic axis.

6. The camera optical lens as described in claim 1, further satisfying following conditions:

$$-5.26 \leq f5/f \leq 13.22;$$

$$-3.22 \leq (R9+R10)/(R9-R10) \leq 9.38; \text{ and}$$

$$0.04 \leq d9/TTL \leq 0.18,$$

where
f5 denotes a focal length of the fifth lens;
R9 denotes a central curvature radius of the object side surface of the fifth lens;
d9 denotes an on-axis thickness of the fifth lens; and
TTL denotes a total optical length from an object side surface of the first lens to an image plane of the camera optical lens along an optic axis.

7. The camera optical lens as described in claim 1, further satisfying a following condition:

$$f/TTL \geq 1.00,$$

where TTL denotes a total optical length from an object side surface of the first lens to an image plane of the camera optical lens along an optic axis.

8. The camera optical lens as described in claim 1, wherein a total optical length from an object side surface of the first lens to an image plane of the camera optical lens along an optic axis is smaller than or equal to 8.59 mm.

9. The camera optical lens as described in claim 1, wherein an F number of the camera optical lens is smaller than or equal to 2.47.

* * * * *